May 6, 1969  J. B. McMASTER  3,442,316
INNERTUBE VALVE STEM FOR TUBELESS RIMS
Filed Aug. 10, 1966
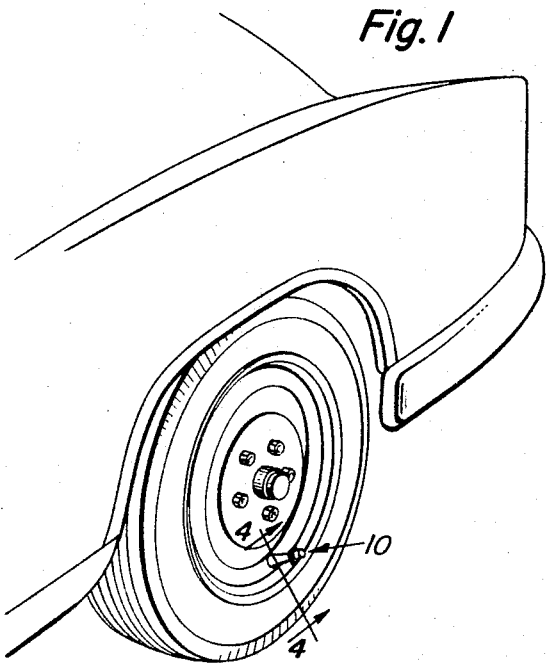
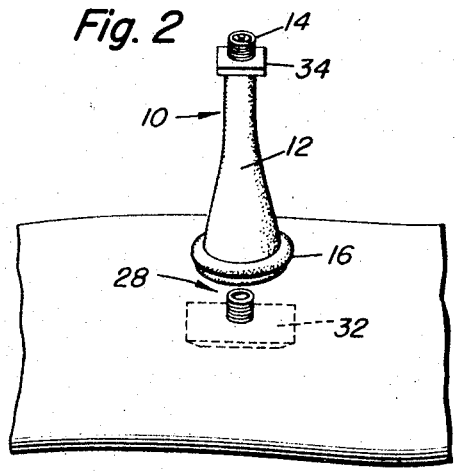
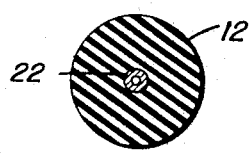
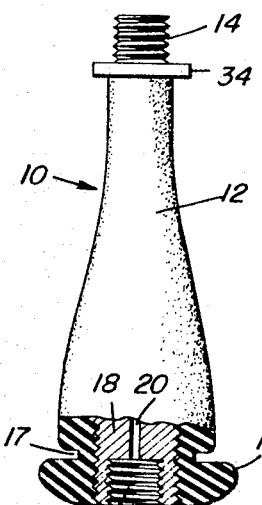
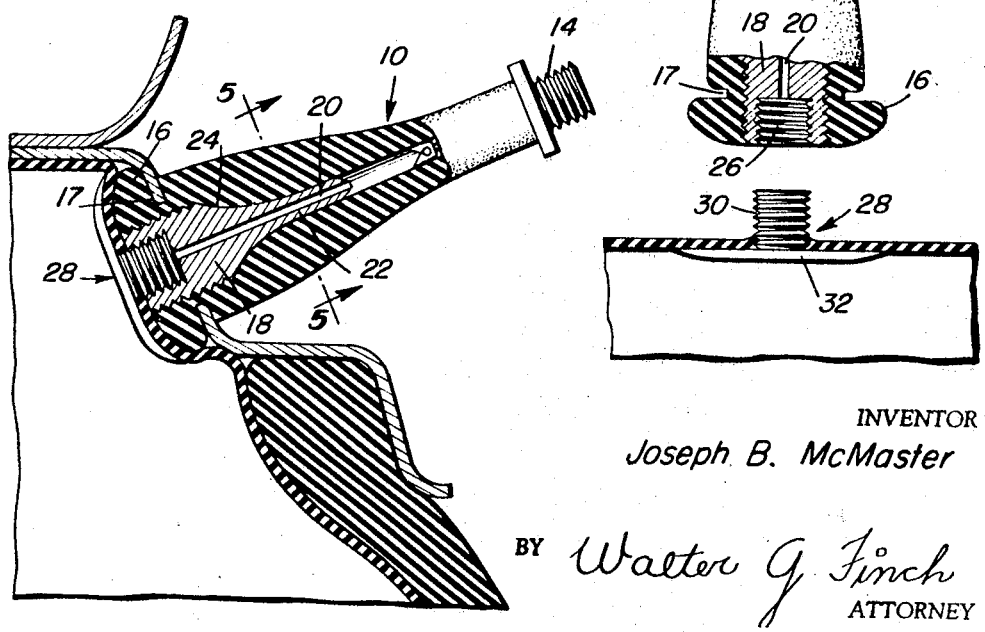
INVENTOR
Joseph B. McMaster
BY Walter G. Finch
ATTORNEY

United States Patent Office 3,442,316
Patented May 6, 1969

3,442,316
INNERTUBE VALVE STEM FOR TUBELESS RIMS
Joseph B. McMaster, Sherwood Road,
Cockeysville, Md. 21030
Filed Aug. 10, 1966, Ser. No. 571,444
Int. Cl. B60c *29/00*
U.S. Cl. 152—427    4 Claims

ABSTRACT OF THE DISCLOSURE

A valve stem is disclosed which is easily replaceable and serves equally well with tubeless as well as tubed tires which use Schrader type valves. There is provided a button head and adjacent groove at the base of a tapered elastomer valve stem body. This end of the assembly also has a tapered and bored metal insert secured by ridges and having a female thread.

For an airtight seal, the button head snaps against the rim when the stem is pulled through the valve stem aperture of the rim in the case of either tubeless or tubed tires. Where an inner tube is used, it is provided with only an aperture. A base having a male threaded shank is inserted into the tube with the shank protruding and this is securely threaded into the female thread of the stem bringing the button head firmly into airtight contact with the the surface of the inner tube.

---

This invention relates generally to tires, and more particularly it pertains to valve stems for innertubes.

There is considerable merit in the use of innertubes in the so-called tubeless tires because a more uniform tread wear is obtained from the casing when supported by an innertube together with improved factor of safety in the clinch of the casing to the rim. The tubeless tire valve stem is, of course, airtight where it enters the hole in the rim but present innertubes when used in tubeless type rims sacrifice this seal.

It is an object of this invention, therefore, to provide an improved valve stem for innertubes which seals in the aperture in tubeless tire rims to alleviate a source of slow leakage.

Yet another object of this invention is to prove an easily replaceable valve stem for tubeless rims which can also be used as a valve stem for innertubes when desired.

Another object of this invention is to provide a valve stem which snaps into the rim aperture to anchor and prevent creeping of an innertube within a tire casing.

Still another object of this invention is to provide a universal valve stem which is easily attached to innertubes so that inner tubes can be sold without same at a saving of cost when an innertube is to be installed in tubeless tires.

Other objects and attendant advantages of this invention will become more readily apparent and understood from the following detailed specification and single sheet of accompanying drawings in which:

FIG. 1 is a perspective view of a vehicle wheel showing the novel valve stem incorporating features of this invention in place in the rim;

FIG. 2 is a view showing the installation of the valve stem of the invention to an innertube;

FIG. 3 is a full size view similar to FIG. 2 but cut away to show details of the invention;

FIG. 4 is a full sized detail view, mostly in section, illustrating the assembled valve stem and tube in place in a tubeless tire; and FIG. 5 is a cross-section taken on line 5—5 of FIG. 4.

Referring now to the details of the invention as shown in the drawings, reference numeral 10 indicates generally a valve stem embodying features of this invention. This valve stem 10 consists of an elongated tapered elastomer body 12 into the narrower end of which is molded the usual Schrader valve 14 which is used with standard inflating equipment.

The opposite end of the body 12 is formed with an enlarged button head 16 which is separated from the rest of the body by a narrow circumferential groove 17. Within this end of body 12, there is molded a metal insert 18 having a longitudinal bore 20 therethrough. This insert 18 tapers at its inner end 22, as shown best in FIG. 4, conforming with a somewhat greater taper to the taper of the body 12 and toward the outer end it is convoluted with ridges 24.

The bore 20 is enlarged at this end and provided with a female thread 26, the outer end of which is flush with the face of the button head 16.

To mate with this thread 26, there is provided a removable centrally apertured metal thimble 28 having a male threaded shank 30 and a rectangular flat base 32. This base 32 is smoothed or de-burned around its edges and may be slightly dished in cross section.

The valve stem 10 is installed for use by inserting the base 32 through an aperture in an innertube as shown in FIGS. 2 and 3. The protruding shank 30 is then securely threaded into the female thread 26 bringing the button head 16 firmly into airtight contact with the surface of the innertube. For this purpose, there is provided a wrenching shoulder 34 of square or hexagonal shape secured to the Schrader valve 14.

The innertube thus assembled with the improved valve stem 10 is inserted in the tire casing which mounts conventionally on the wheel rim as shown in FIGS. 1 and 4. As shown in FIG. 5 the cross section of the tapered elastomer body 12 is round and smooth and therefore is easily pulled into the valve stem aperture of the usual tubeless rim up to the botton head 16 whereupon the edges of the aperture snap into the groove 17. This action is aided by the greater thickness of resilient elastomer body 12 about the tapered inner end 22 of the insert 18.

It will be noted the button head 16 thus forms an airtight seal between the innertube backed by base 32 and the wheel rim. Therefore should any slow leaks occur, the air will still be retained by the rim-sealed tire casing without escaping around the valve stem 10 as in the usual installation of innertubes in tubeless tires.

Further, the positive engagement of the novel valve stem 10 in the rim aperture anchors the innertube from creeping around within the casing even if operated underinflated.

What is claimed is:

1. In a dual purpose pneumatic tire device comprising a flanged and valved perforate eleastic body for contemporaneous co-acting sealing of the respective inflation apertures of an innertube and a tubeless tire assembly containing the innertube by flanged engagement with the innertube aperture and insertive engagement in the tubeless tire assembly aperture, the improvement comprising: the said body having a smaller end wherein the said valve is contained, and a larger end having a rigid internally threaded insert affixed substantially flush therein and having extension into the body short of the valve, the said extension including an externally tapered portion of the insert.

2. A device as recited in claim 1, the said flange including a rigid perforate plate and threaded thimble unit; the thimble being smaller than the plate and thereby adapted to pass through an innertube inflation aperture for engaging the interally threaded insert and gripping the material of the innertube simultaneously between the rigid insert and the rigid plate and between the end of the elastic body and the rigid plate.

3. A device as recited in claim 2, the said elastic body having an external groove near the larger end and an external taper, whereby on inflation of the innertube the body can be bent and drawn flexibly for engagement of the groove with the tubeless tire assembly aperture for sealing thereof.

4. A device as recited in claim 3, and a protrusive wrenching flat affixed at the smaller end of the elastic body whereby the body can be manipulated for engagement with the threaded thimble and the tubeless tire assembly aperture.

References Cited

UNITED STATES PATENTS

| | | | |
|---|---|---|---|
| 604,424 | 5/1898 | Schrader | 152—427 |
| 2,275,820 | 3/1942 | Hosking | 152—429 |
| 2,699,810 | 1/1955 | Ferguson | 152—427 |
| 2,872,963 | 2/1959 | Boyer | 152—427 |
| 3,258,051 | 6/1966 | Kilmarx | 152—427 |
| 2,652,858 | 9/1953 | Snyder | 152—427 |
| 2,844,182 | 7/1958 | Hall | 152—427 |
| 3,134,418 | 5/1964 | McConkie | 152—427 |

ARTHUR L. LA POINT, *Primary Examiner.*

CHARLES B. LYON, *Assistant Examiner.*